M. U. BERNHEIM.
SYSTEM FOR TRANSFERRING FREIGHT AND BAGGAGE.
APPLICATION FILED JAN. 4, 1912.

1,124,267.

Patented Jan. 12, 1915.

Witnesses

Inventor
Morris U. Bernheim
By C. J. Stockman
Attorney

UNITED STATES PATENT OFFICE.

MORRIS U. BERNHEIM, OF CINCINNATI, OHIO, ASSIGNOR TO THE ALVEY-FERGUSON COMPANY, OF OAKLEY, CINCINNATI, OHIO, A CORPORATION OF OHIO.

SYSTEM FOR TRANSFERRING FREIGHT AND BAGGAGE.

1,124,267.      Specification of Letters Patent.      Patented Jan. 12, 1915.

Application filed January 4, 1912. Serial No. 669,468.

*To all whom it may concern:*

Be it known that I, MORRIS U. BERNHEIM, a citizen of the United States, residing at Cincinnati, in the county of Hamilton and State of Ohio, have invented new and useful Improvements in Systems of Transferring Freight and Baggage, of which the following is a specification.

This invention relates to a carrier adapted to form an element of a system for transferring freight or baggage, the system herein referred to being such as is embodied, for example, in the following co-pending applications for Letters Patents of the United States, to wit: Serial Number 499,337, filed June 1, 1909, renewed June 4, 1914, Serial Number 843,091; Serial Number 575,511, filed Aug. 4, 1910, renewed June 4, 1914, Serial Number 843,092; Serial Number 842,950 filed June 4, 1914; Serial Number 842,951 filed June 4, 1914, and Serial Number 842,996 filed June 4, 1914.

Figure 1:
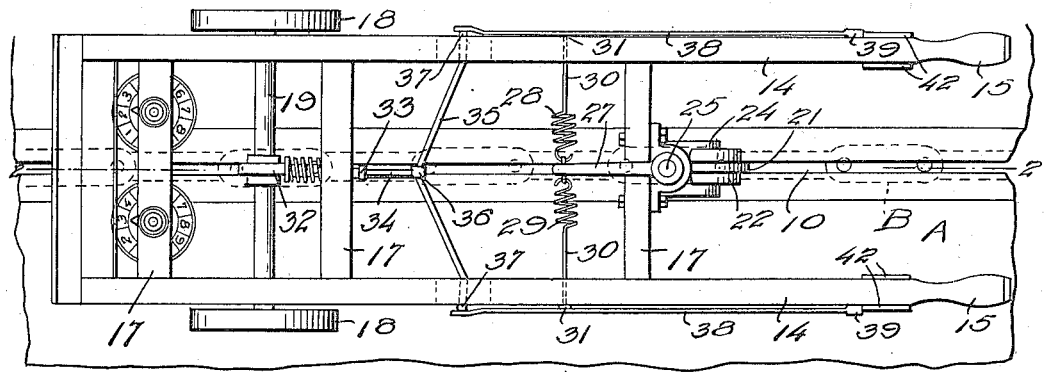
Figure 2:
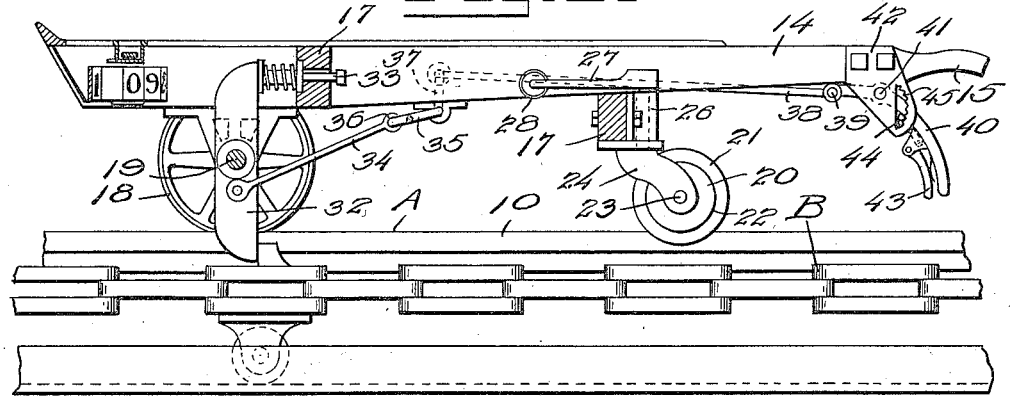
Figure 3:
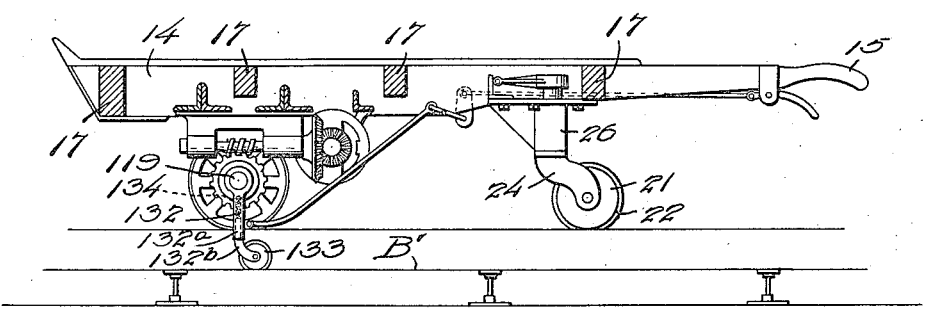

In the accompanying drawings, illustrating the invention: Figure 1 is a plan view of a two wheel truck embodying the present improvements, showing the same upon a way adapted to coöperate therewith. Fig. 2 is a section on the line 2—2 of Fig. 1, showing one form of means for delivering power to the truck. Fig. 3 is a view like Fig. 2 but showing a form of truck adapted to be electrically propelled.

The systems of transferring freight or baggage hereinbefore referred to comprise a way A having a groove 10. A wheeled carrier travels upon said way and has an element which extends into the groove into operative relation with a means for delivering power to propel the carrier. This means may be an endless traveling chain, as shown at B in Fig. 2, or it may be a conductor of electricity as shown at B' in Fig. 3, or of any other suitable nature. With respect to the systems themselves it is believed to be unnecessary herein more particularly to disclose the same, for the reason that reference may be had to my applications referred to for any further information desired and for the further reason that it is not intended to confine the present invention to its use as an element of the particular systems referred to, as it may be usefully employed in systems of other particular descriptions.

The body of the truck shown in all the figures of the drawing is preferably formed of longitudinal side pieces 14 terminating at the rear in handles 15 and connected with each other at different places in the length thereof by transverse members 17. The truck is mounted upon wheels 18 arranged near the front end thereof upon an axle 19. It is also provided at the rear with a wheel 20 which in the exemplified form of the invention serves to support the rear end of the truck, there being no other wheels at this end of the truck: but it is apparent that the wheel 20 and the other features of the herein described invention may be applied to trucks having any suitable number of supporting wheels a further example of which is presented by the trucks or carriers having two additional wheels at the rear end, such trucks or carriers being shown, for example, in my applications hereinbefore referred to. The wheel 20 is provided with a flange 21 which runs in the groove 10 in the way A and on opposite sides of its said flange it has plane portions 22 to run on the portions of the way on opposite sides of and contiguous to said groove. It is mounted on an axle 23 borne by a yoke 24 which carries a vertical spindle 25 journaled in a socket 26 secured to one of the cross pieces of the truck frame. From the upper end of the spindle an arm 27 extends into engagement with cross springs 28 and 29 which preferably are provided with means for adjusting their tension, the means here shown for this purpose comprising longitudinally movable rods 30 which extend from the springs and are supported by the longitudinal members of the truck frame, the movement of the rods being effected by nuts 31 mounted on their ends. The wheel 20 is obviously adapted to follow any variation in the line of the groove 10 and is laterally yieldable and held against the walls thereof.

The front of the truck is provided with an element which extends downward therefrom into engagement with power delivering means operatively related to the groove 10, into which said element extends, as hereinbefore stated, the power delivering means may be of any suitable character. When an endless traveling chain, such as the chain B Fig. 2, is employed as the power-delivering means, the element for transmitting power therefrom to the truck is preferably a bar 32 pivoted between its ends upon the axle 19 and having its upper end engaged by a shock-absorbing device comprising a spring-pressed rod 33. This bar may be raised or lowered from or into its operative position by a mechanism which comprises a link 34 which is pivoted to the bar below the fulcrum of the latter and extends thence rearward to the crank portion 35 of a transverse shaft, to which its rear end is connected at 36. This transverse shaft is journaled in the side pieces 14 of the frame and its ends at 37 are connected to links 38 the rear ends of which are pivoted at 39 to bent handles or grip pieces 40, which, in turn, are pivoted between their ends, at 41, to plates 42 which extend from the side members of the truck frame and are so located with respect to the handles 15 of the truck that an attendant may include both in his grasp when it is desired to disengage the element 32 from the propeller and raise the truck for manual propulsion. To hold the element 32 in raised position, suitable means, such, for example, as pivoted grips 43 having lugs or dogs 44 to engage arcal teeth 45 formed in the plates 42, may be employed.

The truck shown in Fig. 3 has its pendant element, marked 132, provided with a terminal 133, the latter being preferably rotative. The pendant element 132 is formed of two relatively movable sections 132ª and 132ᵇ, one of said sections (132ª) being a sleeve which is telescopically engaged by the other section, the latter section carrying the terminal and the sleeve section having a spring 134 for holding the terminal upon the conductor B′, which conductor in this particular exemplification of the invention constitutes a means, corresponding to the chain B, for delivering power to the truck. This element 132 is pivotally mounted on the axle, marked 119, and is provided with means for turning it pivotally which means, may be substantially identical with those shown in Figs. 1 and 2 and already described, and need not be more particularly referred to herein. In this particular form of the invention the truck is provided with an electric motor having connection with its driving wheels, but as any suitable construction thereof may be employed it is not considered to be necessary more particularly to refer to the same herein.

In practice, the pendant elements which extend into the grooves for engaging the power delivering means of both forms of the invention are preferably so related to the walls of the grooves as to serve as guiding means of the trucks.

Having now described the invention what I believe to be new and desire to secure by Letters Patent, is:

1. A carrier provided with supporting wheels adapted to traverse a way, said carrier also having a guiding element which is spring-pressed laterally and is adapted to extend into a groove in said way.

2. A carrier provided with supporting wheels adapted to traverse a way, said carrier also having a guiding element adapted to extend into a groove in the way, said guiding element being mounted to turn pivotally upon a vertical axis and being spring-pressed laterally.

3. A wheeled carrier provided with a guide wheel adapted to a groove in the way on which the carrier runs, said guide wheel, being mounted to have lateral movement and provided with means for pressing it yieldably against the walls of the groove.

4. A wheeled carrier having supporting wheels at one end and a wheel at its other end, the latter being adapted to a groove in the way on which the carrier runs and having a support pivoted to turn upon a vertical axis and a spring-mechanism having connection with said support and adapted to hold the last mentioned wheel yieldably against the walls of the groove.

5. A wheeled carrier having supporting wheels at one end and a wheel at its other end, the latter being adapted to a groove in the way on which the carrier runs and having a support pivoted to turn upon a vertical axis and provided with an arm, and springs arranged on opposite sides of said arm and connected thereto, whereby the last mentioned wheel is held yieldably against the walls of the groove.

6. A wheeled carrier having suitable supporting devices, including a wheel having a flange adapted to run in a groove, said wheel being pivoted to follow variations in the lines of the groove and having means for pressing its flange yieldably against the side walls of the groove.

7. A wheeled carrier having suitable supporting devices, including a wheel having a flange adapted to run in a groove, said wheel also having a vertical spindle, an arm extending from the free end of the spindle and springs connected to opposite sides of the arm.

8. A wheeled carrier having suitable supporting devices, including a wheel having a flange adapted to run in a groove, said wheel also having a vertical spindle, an arm extending from the free end of the spindle and springs connected to opposite sides of the arm and provided with means for connecting them to the body of the carrier, said means being adjustable to regulate the tension of the springs.

9. A wheeled carrier, having a handle, a device carried by and extending from said carrier and arranged to engage a means outside the carrier for delivering power which propels the carrier, and means extending from said device to the handle of the carrier, for adjusting the device out of operative relation with the power-delivering means.

10. A wheeled carrier having a handle by which it may be manually propelled and provided with a device adapted to engage a means for delivering power to the carrier, for automatic propulsion thereof, and manually-operable means for adjusting said device out of operative relation with the power-delivering means, said adjusting means having an operating element arranged adjacent to the handle of the carrier.

11. A wheeled carrier provided with a pivoted device adapted to engage a means for delivering power to the carrier, said carrier having a handle, and a lever-mechanism extending from said device to the handle of the truck, for adjusting the former.

12. A wheeled carrier having a handle, a pivoted device depending from the forward end of the carrier and adapted to engage a means for delivering power to the carrier, a crank-shaft, connections between the crank-shaft and said device, and actuating means for said shaft, extending thence to the rear end of the carrier.

13. A wheeled carrier, having handles, a pivoted device depending from the forward end of the carrier and adapted to engage a means for delivering power to the carrier, a crank-shaft, connections between the crank-shaft and said device, and actuating means for said shaft, extending thence to the rear of the carrier and terminating in handles arranged contiguous to the handles of the carrier and disposed in position to be actuated by the attendant when he also grips the carrier handles.

14. A carrier having a handle at its rear end and a pendant device adjustably connected with its forward end, the pendant device being adapted to engage a means for delivering power to the carrier, and an adjusting means for said device having its actuating portion at the rear end of the carrier.

15. A wheeled carrier having a pivotally-supported element which is adapted to extend into a groove in the way upon which the carrier runs and to engage a means which is operatively related to said groove and serves to deliver power to said carrier, and means for raising said element to clear it from the groove.

16. A wheeled carrier having a pivotally-supported element which is adapted to extend into a groove in the way upon which the carrier runs and to engage a means which is operatively related to said groove and serves to deliver power to the carrier, a lever, and connections between said lever and element for raising the latter out of engagement with the power-delivering means, the carrier also having a handle by which it may be manually propelled.

17. A wheeled carrier having a pivotally-supported element which is adapted to extend into a groove in the way upon which the carrier runs and to engage a means which is operatively related to said groove and serves to deliver power to the carrier, a lever, and a link connecting said lever to said element, the carrier also having a handle by which it may be manually propelled.

18. A wheeled carrier having a pivotally supported element which is adapted to extend into a groove in the way upon which the carrier runs and to engage a means which is operatively related to said groove and serves to deliver power to the carrier, a lever, a crank, an arm connecting the crank to said pivotally supported element and an arm connecting the crank to the lever, the carrier also having a handle by which it may be manually propelled.

19. A wheeled carrier adapted for both manual and automatic propulsion, said carrier having a handle for convenience in propelling it manually and also having a pendent element adapted to engage a means for delivering power to the carrier, for propelling the latter automatically, the pendent element being pivotally mounted and provided with adjusting means for raising it out of engagement with the power delivering means, said adjusting means comprising an actuating element adjacent to the handle of the carrier and a jointed system of arms extending from the actuating element to the pendent element.

20. A wheeled carrier adapted for both manual and automatic propulsion, said carrier having a handle for convenience in propelling it manually, and also having a pendent element adapted to engage a means for delivering power to the carrier for propelling the latter automatically, the pendent element being pivotally mounted and provided with an adjusting means for raising it out of engagement with the power delivering means, said adjusting means comprising an actuating lever adjacent to the handle, a crank, a link connecting the crank with the pendent element and a link connecting the crank with the actuating lever.

21. A wheeled carrier having a guiding element provided with a means adapted to engage a means for delivering power to said carrier, and means for raising the guiding element and its said means out of operative position.

22. A wheeled carrier having a pivotally-supported guiding element adapted to extend into a groove in the way upon which the carrier runs and provided with means adapted to engage a power-delivering means operatively related to said groove, and means for raising the guiding element and its said means out of said groove.

23. A wheeled carrier having a pivotally-supported guiding element adapted to extend into a groove in the way upon which the carrier runs and provided with means adapted to engage a power-delivering means operatively related to said groove, and means for raising the guiding element and its said means out of said groove comprising a lever and a link connecting said lever with said element.

24. A wheeled carrier having means for propelling it electrically, a guiding means for the carrier adapted to a groove in the way upon which the carrier runs, a pivotally mounted supporting element for the guiding means having a vertical axis, and means for holding the supporting element yieldably in lateral position.

25. A wheeled carrier having means for propelling it electrically, a guiding means for the truck adapted to a groove in the way upon which the carrier runs, a supporting element for the guiding means, a vertical spindle, an arm projecting from said spindle and springs extending transversely of the truck and acting upon said arms.

26. A wheeled carrier having a handle and a pendent pivotally-supported element, said element being provided with an electric terminal, and a link and lever connection to said element for raising the same pivotally, said connection having an actuating element adjacent to the handle.

27. In a system of the kind described, a grooved way, and a wheeled carrier having means for propelling it electrically and provided with a guiding element adapted to a groove in the way, the carrier having means for raising said element from said groove.

28. In a system of the kind described, a way having a groove, a freight or baggage truck having an electric motor and a pendent element which travels in the groove and has a terminal connected with said motor, a conductor below the surface of the latter, in operative relation with said terminal and mechanism for raising said terminal out of said groove.

29. In a system of the kind described, a way having a groove, a wheeled freight or baggage truck adapted to be moved on said way and having means extending into the groove for guiding it, a motor on said truck, a conductor below the surface of the way in operative relation with the groove, an element connected with the motor and engaging the conductor, and means for disconnecting said element from the conductor and moving the guiding means out of the groove.

30. A freight or baggage truck having means for propelling it electrically including a pendent element provided with a terminal, and a lever mechanism arranged below the floor of the truck and connected with said element and having an actuating portion adjacent to one end of the truck for raising said element and terminal to inoperative position.

31. In a system of the kind described, a way having a groove, a freight or baggage truck having means for propelling it electrically upon the way and including a pendent element which extends into the groove and has a terminal at its lower end, a conductor in operative relation with said terminal, and means connected with the pendent element for raising the same out of the groove and disconnecting the terminal from the conductor, said means having an actuating element at one end of the truck.

In testimony whereof I have hereunto set my hand in presence of two subscribing witnesses.

MORRIS U. BERNHEIM.

Witnesses:
OSCAR KOEHLER,
E. PURNOR BERNHEIM.